A. BARCHIESI.
AUTOMATIC VALVE CLOSER.
APPLICATION FILED MAY 28, 1920.
1,374,273.
Patented Apr. 12, 1921.
2 SHEETS—SHEET 2.
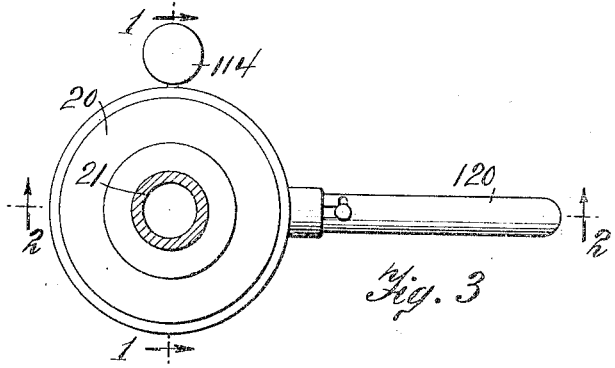
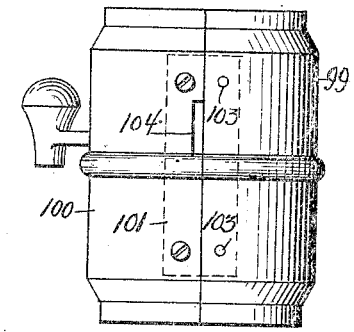
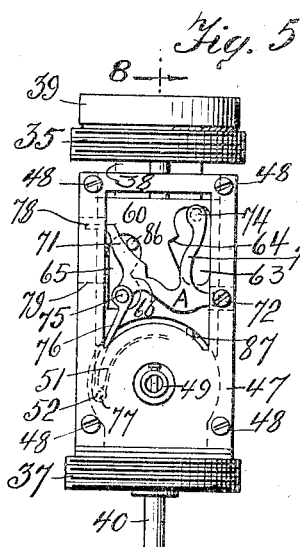
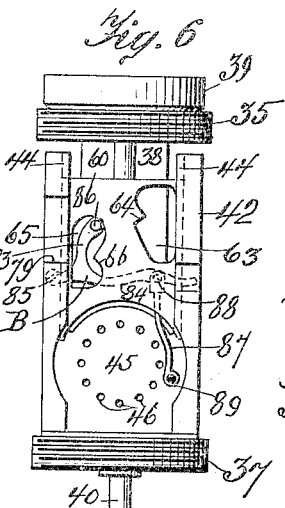
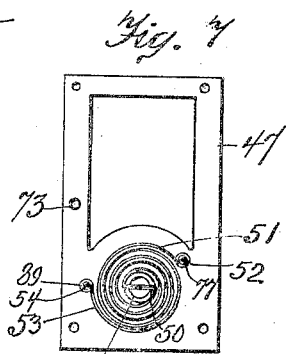
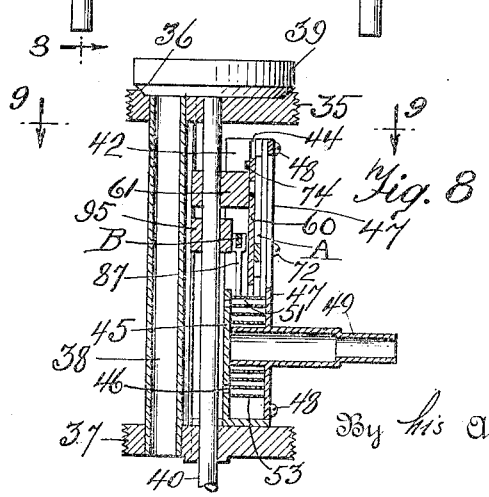
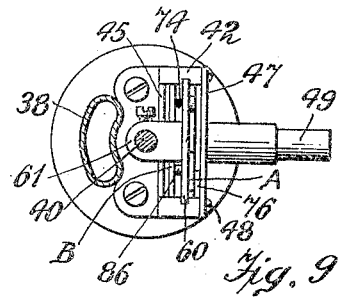
Inventor
Aurelio Barchiesi
By his Attorney
N.A. de Bomeville

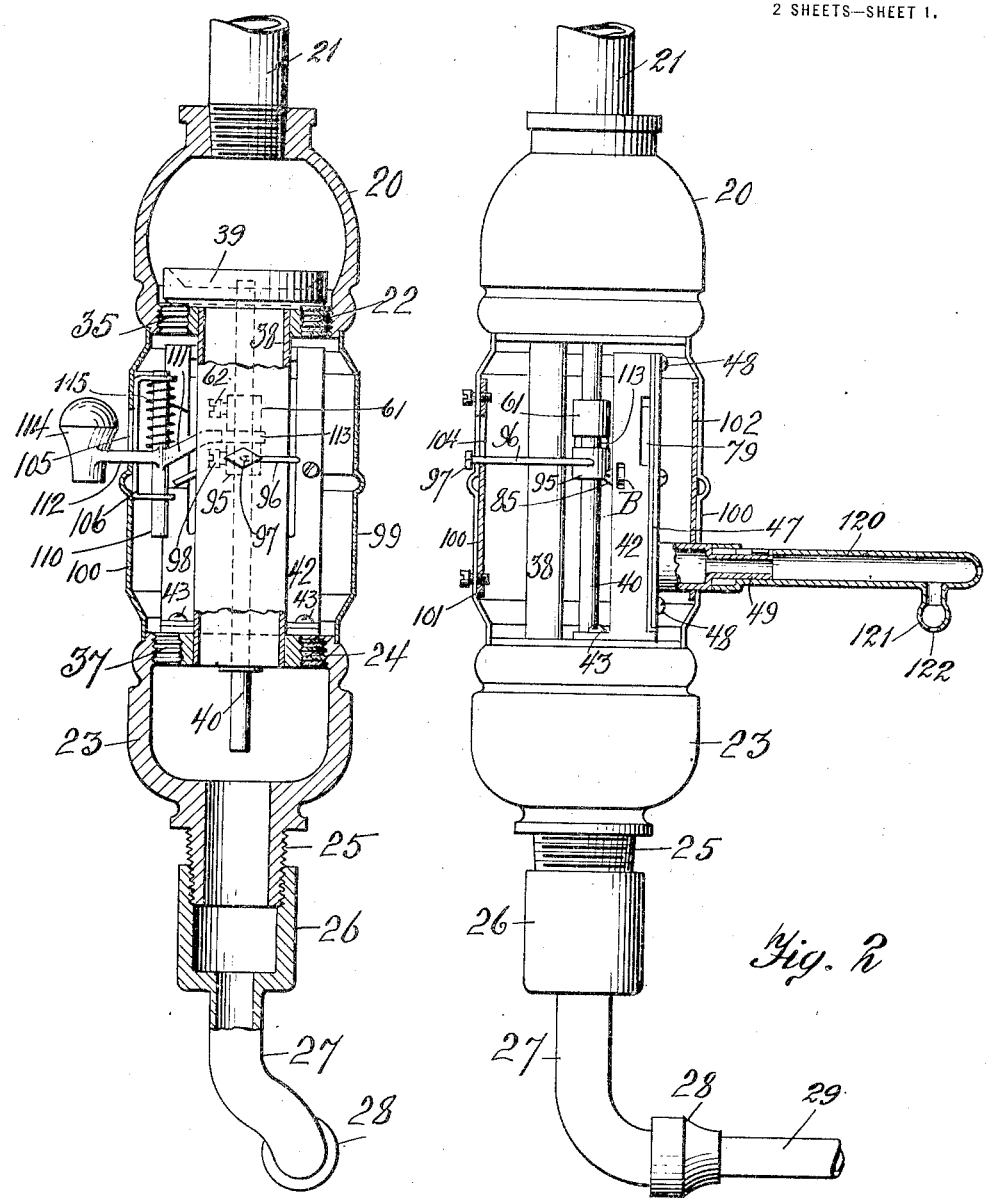

UNITED STATES PATENT OFFICE.

AURELIO BARCHIESI, OF JERSEY CITY, NEW JERSEY, ASSIGNOR OF ONE-FIFTH TO ANGELO BARATTA, OF JERSEY CITY, NEW JERSEY, AND ONE-FIFTH TO GIOVANNI SQUARCIALUPI AND ONE-FIFTH TO LOUIS L. BOLLINE, BOTH OF NEW YORK, N. Y.

AUTOMATIC VALVE-CLOSER.

1,374,273.  Specification of Letters Patent.  Patented Apr. 12, 1921.

Application filed May 28, 1920. Serial No. 384,797.

*To all whom it may concern:*

Be it known that I, AURELIO BARCHIESI, a subject of the King of Italy, and resident of Jersey City, in the county of Hudson and State of New Jersey, have invented certain new and useful Improvements in Automatic Valve-Closers, of which the following is a specification.

This invention relates to an automatic valve closer and is connected to a line of gas piping to automatically stop the flow of gas, in case the light that is supplied with the gas is extinguished accidentally or otherwise.

The organization of the invention comprises a valve which is manually opened, and automatically closed by the contraction of a spring which permits the valve to close, when cooled and contracted. The heat of the light controlled expands the spring The latter when expanded coacts with mechanism to maintain the gas valve open.

Figure 1 represents a section on the line 1, 1 of Fig. 3 of the automatic valve closer; Fig. 2 represents in part an elevation of the valve closer with a partial section as on the line 2, 2 of Fig. 3; Fig. 3 is a top plan view of the valve closer; Fig. 4 represents an elevation of a casing for the valve closer; Fig. 5 shows an elevation of the control mechanism of the valve closer; Fig. 6 represents an elevation similar to Fig. 5 with some elements removed; Fig. 7 shows a rear view of a pair of the elements of Fig. 5; Fig. 8 is a section of Fig. 5 on the line 8, 8 and Fig. 9 shows a section of Fig. 8 on the line 9, 9.

An inlet chamber 20 has connected to its upper end the gas inlet pipe 21 and at its lower end has formed therein the threads 22. An outlet chamber 23 is provided with the threads 24 at its upper end and at its lower end is formed the threaded outlet nozzle 25 for the coupling 26 of the conduit 27. A coupling 28 connects the conduit 27 to the outlet pipe 29.

A valve support 35 is in threaded engagement with the threads 22, and is provided with the valve seat 36. A lower support 37 is in threaded engagement with the threads 24 of the outlet chamber 23. A gas conduit 38 is fastened to and extends through supports 35 and 37. A gas valve 39 coacts with the valve seat 36 and has extending therefrom the valve stem 40 which latter is guided in openings in the supports 35 and 37. A guide frame 42 is fastened to the lower support 37 by means of screws 43, and is provided with the guides 44. A rear wall 45 of the guide frame 42 has formed therein perforations 46. To the front face of the frame 42 is clamped the cover plate 47 by means of the screws 48. A heat nozzle 49 is formed with the plate 47 and extends to the rear wall 45 of the frame 42 and is provided with slots 50. One end of the spiral springs 51 and 53 are respectively provided with the eyes 52 and 54 and engage the slots 50. The spring 51 is thinner and lighter than the spring 53. The said springs are located around the nozzle 49 between the wall 45 and the plate 47. A slide plate 60 slides in the guides 44 and has riveted thereto the sleeve 61, which latter is fastened to the valve stem 40 by means of the set screw 62. The plate 60 has formed therein the opening 63 with the locking heel 64 and the opening 65 with the locking heel 66. A special bell crank A with the arms 70, 71 is pivoted on the pivot 72 which latter is supported in an opening 73 of the cover plate 47. The arm 70 has extending therefrom a locking pin 74 which extends through the opening 63. A pivot 75 connects the arm 71 with one end of a link 76 and the other end of the link 76 is connected to the eye 52 of the spring 51, by means of the pin 77.

A guide toe 78 extends from the arm 71 and is guided in an opening 79 of the frame 42. A second bell crank B is shown with the arms 83 and 84 and is pivoted to the frame 42 by means of the pin 85. The arm 83 has a second locking pin 86 which extends through the opening 65 of the plate 60. A link 87 has one end pinned to the arm 84 by means of the pin 88, and its other end is pinned to the eye 54 of the spring 53 by means of the pin 89.

A sleeve 95 with the arm 96 having the pointer 97 is fastened to the valve stem 40 by means of the set screw 98. A cover is shown with the two portions 99 and 100. Connecting plates for the said portions are shown at 101 and 102. The plate 101 is riveted to the portion 99 by means of the rivets 103 and the plate 102 is riveted to the portion 100. The portion 100 and the plate 101 have formed therein the slot 104 for the arm 96. The portion 100 has formed therein a slot 105. A U shaped bracket 106 is fastened to portion 100. A spring plunger 110 has formed therewith the arms 111 and 112. The arm 111 has formed therewith a fork 113 which engages the valve stem 40 between the sleeves 61 and 95. An operating knob 114 is formed at the outer end of the arm 112. A spring 115 surrounds the plunger 110 and bears between the upper flange of the bracket 106 and the arms 111 and 112.

A heating tube 120 has formed therewith the bulb 121 having the opening 122. The tube 120 is detachably supported on the heat nozzle 49.

To operate the automatic valve closer the user lifts the knob 114 and thereby the slide plate 60 is raised. With the rise of the plate 60 the locking pin 86 is locked under the heel 66 of the opening 65 and locks the plate 60 in its upper position, whereby the valve 39 is located and maintained in its upper or open position. By this means the gas is permitted to flow from the pipe 21 through the valve closer and through the outlet pipe 29. The outlet pipe 29 leads to a burner not shown which is now lit. The bulb 121 is within the zone of the heat of the said burner and heated air will flow through the opening 122 into and through the tube 120 and finally will reach the springs 51 and 53. Both springs will expand from the effect of the heat and the spring 51 being thinner than the spring 53, it functions first and will lower the link 76 which in turn will swing the bell crank A and the locking pin 74 will be located under and locked with the heel 64 of the plate 60. This maintains the valve 39 in its open or upper position. Next the spring 53 will expand and raise the link 87 which causes the bell crank B to swing and disengages the pin 86 from the heel 66. In case the light of the burner is extinguished the springs 51 and 53 will cool and contract and the spring 51 being the thinner will function first and cause the bell crank A to swing to its original position thereby causing the locking pin 74 to disengage from the heel 64 and the valve 39 will drop to its seat by gravity and from the effect of the tension of the spring 115. The spring 53 will now swing the bell crank B and the pin 86 to its original position.

Having described my invention, what I desire to secure by Letters Patent and claim is:

1. In a valve closer the combination of a valve, a slide plate moving with the valve, means to manually raise the valve with the slide plate, a pair of locking heels in the slide plate, a pair of bell cranks, pivoted adjacent to the slide plate, a locking pin on one of the arms of each bell crank and a pair of springs within the heat zone of the light to be controlled, one of said springs coacting with one of said bell cranks and the other spring coacting with the other bell crank.

2. In a valve closer the combination of a valve, a slide plate moving with the valve, means to annually raise the valve with the slide plate, a pair of locking heels in the slide plate, a pair of bell cranks pivoted adjacent to the slide plate, a locking pin on one of the arms of each bell crank and a pair of springs within the heat zone of the light to be controlled, one of said springs being lighter than the other, the lighter spring coacting with one of the pins of one of the bell cranks which pin in turn locks with one of said heels to lock the slide plate in its upper position, the other or heavy spring when affected by heat unlocking the pin of the second bell crank from the second heel of the slide plate, the thin spring when the controlled light is extinguished contracting and unlocking the first pin from its heel and the second spring next cooling and contracting to locate the second locking pin in its original position.

3. In a valve closer the combination of a valve, a valve stem extending from the valve, a slide plate connected to valve stem and having a pair of locking heels, a guide frame for the slide plate, a cover plate for the frame, a bell crank pivoted to one side of the guide frame, a locking pin extending from one arm of the bell crank coacting with one of said locking heels, a pivot extending from the other arm of the bell crank, a pair of spiral springs one thinner than the other located between the guide frame and its cover, a link connecting the thinner spring and said pivot of the bell crank, a second bell crank pivoted to the other side of the frame, a second locking pin carried by one of the arms of the second bell crank coacting with the second heel of said slide, a link connecting the other arm of the second bell crank and the second spring, a heating nozzle carried by the said cover plate to conduct heat to the springs, the said heat nozzle being in the heat zone radiated from a light to be controlled, and means to manually raise the slide plate to lock the said second locking pin to the said second heel of the slide plate.

4. In a valve closer the combination of a valve, a valve stem extending from the valve, a valve support with a seat for said valve, an inlet chamber for the valve support, a support below the first support, an outlet chamber connected to the second support, a gas conduit connecting the two supports, a gas pipe connected to the inlet chamber, a gas pipe connected to the outlet chamber, a guide frame connected to the lower support, a slide plate guide in said frame having a pair of locking heels and connected to the valve stem, a cover plate for the frame, a bell crank pivoted to one side of the guide frame, a locking pin extending from one arm of the bell crank coacting with one of said locking heels, a pivot extending from the other arm of the bell crank, a pair of spiral springs one thinner than the other located between the guide frame and its cover, a link connecting the thinner spring and said pivot of the bell crank, a second bell crank pivoted to the other side of the frame, a second locking pin carried by one of the arms of the second bell crank coacting with the second heel of said slide, a link connecting the other arm of the second bell crank and the second spring, a heating nozzle carried by the said cover plate to conduct heat to the springs, the said heat nozzle being in the heat zone radiated from a light to be controlled, and means to manually raise the slide plate to lock the said second locking pin to the said second heel of the slide plate.

Signed at the borough of Manhattan, city of New York, in the county of New York and State of New York this 27th day of May A. D. 1920.

AURELIO BARCHIESI.